United States Patent
Fischer

[11] 3,896,504
[45] July 29, 1975

[54] HIP JOINT PROSTHESIS
[76] Inventor: Artur Fischer, Altheimer Strasse 219, Tumlingen, Germany
[22] Filed: Oct. 15, 1973
[21] Appl. No.: 406,397

[30] Foreign Application Priority Data
Oct. 14, 1972 Germany............................ 2250501

[52] U.S. Cl...................... 3/1.912; 128/92 C; 85/71
[51] Int. Cl.² .......................................... A61F 1/24
[58] Field of Search ......................... 3/1, 1.9–1.913; 128/92 C, 92 CA, 92 R, 92 B, 92 BA, 92 BB, 92 BC, 92 D; 32/10 A; 85/70, 71

[56] References Cited
UNITED STATES PATENTS
| | | | |
|---|---|---|---|
| 3,174,387 | 3/1965 | Fischer | 85/71 |
| 3,473,222 | 10/1969 | Kester | 32/10 A |
| 3,641,590 | 2/1972 | Michele | 128/92 C |

FOREIGN PATENTS OR APPLICATIONS
| | | | |
|---|---|---|---|
| 1,047,640 | 7/1953 | France | 128/92 C |
| 1,278,641 | 11/1961 | France | 85/71 |

OTHER PUBLICATIONS
"Factors in the Design of an Artificial Hip Joint," by J. Charnley, Proceedings Institution of Mechanical Engineers, Vol. 181, part 3J, pages 104–111, 1966–1967.

*Primary Examiner*—Ronald L. Frinks
*Attorney, Agent, or Firm*—Michael S. Striker

[57] ABSTRACT

A member of a hip joint prosthesis has a socket portion which is to extend into an opening of the hip bone and provided with a concave socket. A flange portion surrounds the socket portion and is adapted to overlie the bone about the opening. The flange portion is provided with apertures and screws are extended through these apertures and engage expansion anchors which are inserted into the bone, so as to expand the expansion anchors and thus retain the member in place on the bone.

4 Claims, 3 Drawing Figures

HIP JOINT PROSTHESIS

BACKGROUND OF THE INVENTION

The present invention relates generally to a prosthesis and more particularly to a surgical prosthesis. Still more particularly, the invention relates to a hip joint prosthesis.

There are instances when the hip joint must be provided with a prosthesis. The hip joint is composed of the socket on the ilium and the ball-shaped head on the femur, this head being received and articulated in the socket. Either or both of these components of the hip joint may require replacing, either as a result of illness, of injury or even birth abnormalities.

It is known to provide either a socket member as a partial prosthesis, a ball member as a partial prosthesis, or both members as a full prosthesis. It is also known to make at least one part of a full prosthesis, usually the socket part, of high-density polyethylene to avoid the high friction and wear which was observed if both parts of the full prosthesis were made of metal so that metal-to-metal contact prevailed. However, although the use of polyethylene has provided an improvement in this type of prosthesis, reducing the friction and the wear resulting therefrom, some degree of wear cannot be completely avoided and over a period of time this results in the necessity for replacing the socket component of the hip joint prosthesis with a new one. This, however, causes considerable difficulties at present, because heretofore the socket component has always been cemented into the depression of the ilium with methyl methacrylate adhesive. This meant that if the socket component had been removed, the methyl methacrylate adhesive had to be removed down to the bone by chiseling it out, the residual parts of the adhesive had to be removed by grinding, and a new opening had to be drilled in the ilium. This required a rather long-lasting surgical procedure, and aside from the general undesirability of having a surgical procedure prolonged any more than is absolutely necessary, this, of course, increased the possibility of infection.

Also, it has heretofore been observed that infections may develop beneath the methyl methacrylate adhesive which is used to cement the socket component in place, and which, if left alone, will result in a destruction of the bone substance. This, again, necessitates a removal of the implanted socket component in order to gain access to the infection, and subsequently (after suppression of the infection) the installation of a new socket component.

One of the particular difficulties during the surgical procedure for implanting and/or removing the socket component is thus the use of the methyl methacrylate adhesive which is a standard procedure in this art. On the one hand, the time required for chiseling out and grinding off the adhesive used for holding a previously installed socket component in place, results in an undesirably long surgical procedure which may lead to surgical trauma and infection. On the other hand, this particular type of adhesive has the undesirable characteristic that it liberates heat as it hardens. This heat, however, can damage the bone substance and for this reason the surgeon must take great care to protect the bone substance and adjacent tissue against damage during the hardening process, which requires elaborate cooling techniques and, of course, also prolongs the surgical procedure.

SUMMARY OF THE INVENTION

It is, accordingly, an object of the present invention to overcome the disadvantages of the prior art.

More particularly, it is an object of the present invention to provide an improved hip joint prosthesis which avoids these disadvantages.

Still more particularly, it is an object of the invention to provide an improved hip joint socket prosthesis wherein the aforementioned disadvantages are overcome, and which can be removed and replaced whenever the reason arises, for instance due to infection or excessive wear, in a simple manner and in a relatively uncomplicated surgical procedure.

In keeping with the above objects, and others which will become apparent hereafter, one feature of the invention resides in a hip joint prosthesis which, briefly stated, comprises a member having a socket portion adapted to extend into depression of the hip, and provided with a concave socket, and a flange portion surrounding the socket portion and adapted to overlie the bone about the opening. Apertures are provided in the flange, and expansion anchors are provided which are insertable into the hip bone. These expansion anchors each include an expansion anchor sleeve and an expander screw which extends through one of the apertures and cooperates with the expansion anchor sleeve for expanding the same inside the bone and thereby mounting the member outside the hip bone.

If necessary to produce a better seating of the flange portion on the bone material surrounding the opening of the hip bone, portions of this bone material may be removed by grinding or the like to provide a planar contact surface. Depending upon the shape and thickness of the corticalis of the bone material, the apertures in the flange portion will be distributed at different circumferential locations.

To install the prosthesis of the present invention, a surgical drill is used to drill openings into the bone for accommodating the expansion anchor sleeves. Thereupon, the socket member with the expansion anchor sleeves is installed and the screws are turned to thereby expand the expansion anchor sleeves inside the bone and anchor the socket member. The number of sleeves used may be varied and will be determined by the surgeon in dependence upon the size and weight of the patient.

When it is necessary to remove the socket member, either to replace it with a new one or to gain access to the bone, it is merely necessary to remove the expansion screws and thereupon to withdraw the socket member. When a new socket member is to be installed, it need merely be put in place and the screws be threaded back into the expansion sleeves. The latter remain in place during the removal of the old and installation of the new socket member.

The trailing end of the expansion sleeves, that is the end closest to the outside of the bone, may be provided with a polygonal portion or flange, advantageously a rectangular flange, and this may be received in one of the apertures in the flange portion of the socket member, the apertures having a mating configuration. Such a construction assures that when the screws are turned for the purpose of expanding the sleeves, the sleeves cannot participate in such turning. If the apertures and flanges on the flange portion and sleeves, respectively, are of rectangular configuration, it is further possible to predetermine the position of each expansion sleeve with reference to the socket member and particularly with reference to the bone material surrounding the opening in which the socket member is installed. Bacause this bead of bone material is not particularly thick in radial direction, it is advantageous if the expansion sleeves will be expanded in tangential direction relative to this bead. The space available for the expansion in this direction is larger, so that the danger of fracturing the bone is eliminated.

The expansion anchor, and in particular the sleeves, are advantageously made of a metal which is inert with respect to the bone material, for instance certain types of steel or exotic metal which are well known to those skilled in this art. It is advantageous if the sleeve has a leading portion, that is the part which is first inserted into the respective hole, which is of tubular configuration and provided with an internal screw thread and a plurality of strips which extend rearwardly from this leading portion and are each of arcuate transverse configuration. These strips will then bend radially behind the corticalis of the bone when an axial force is applied to the tubular leading portion, that is a force acting from the exterior of the bone and pulling the leading portion in direction towards the exterior.

Because the bone has a sponge-like inner substance, so-called medulla, it is necessary that the expansion anchor be so constructed that it acts in the same manner as expansion anchors used for instance in thin dry walls, namely that upon expansion the expansion anchor will form an abutment which is located behind the relatively thin but strong osseous corticalis. Because an inert metal is necessary for making the expansion anchor sleeves, the strips may be provided with kerfs or other weakened portions where it is desired that they should later buckle or bend, so that less force has to be applied to obtain such bending. They may also be prebent in the desired sense. When expanded, the strips buckle in radially outward direction and are then drawn into contact with the inner side of the osseous corticalis. The flange portion of the socket member is then tightly pressed against the exterior of the corticalis, between the head of the respective expander screw and the radially buckled strips of the associated expansion anchor sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
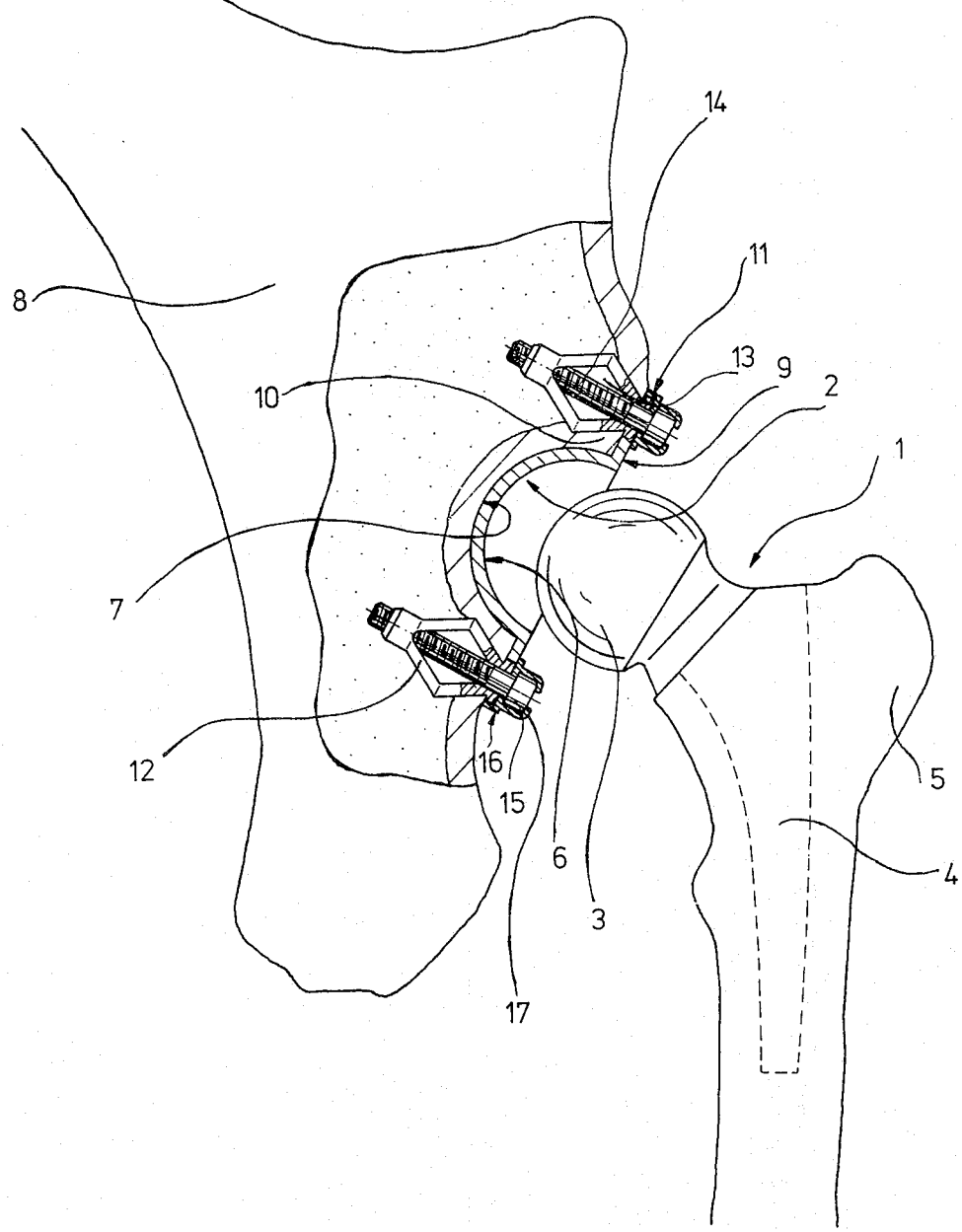
FIG. 1 is a partly sectioned fragmentary view illustrating an embodiment of the present invention installed in the ilium.
Figure 2:
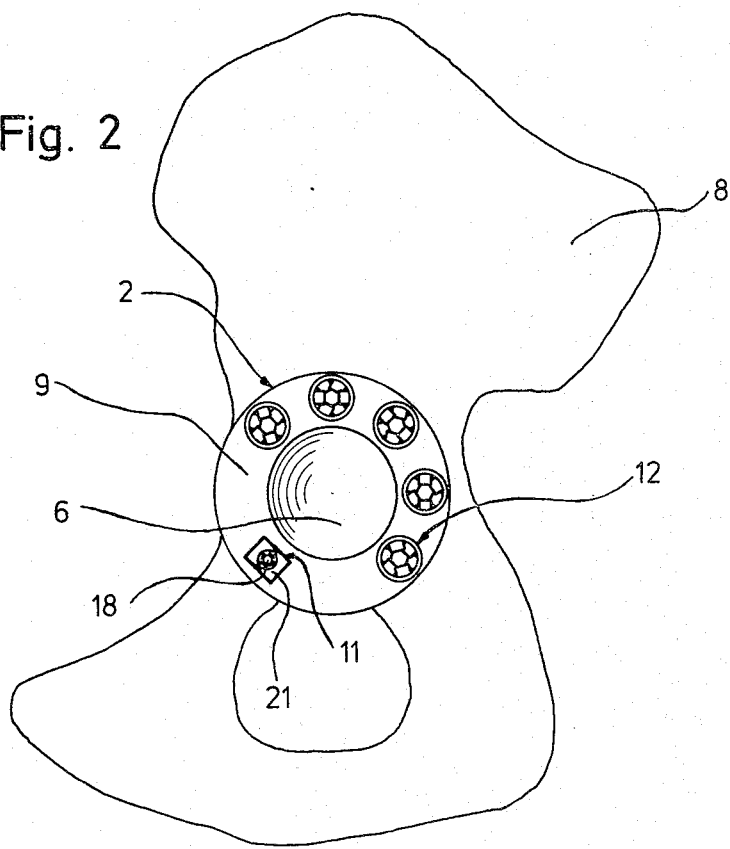
FIG. 2 is a plan view of the socket member of FIG. 1, in installed condition.

Discussing firstly FIGS. 1 and 2, it will be seen that reference numeral 1 identifies the male part of a hip-joint prosthesis, having the ball-shaped portion 3 and being installed in a human femur 5, wherein an anchoring portion 4 is embedded. This part of the prosthesis is not, however, the subject of the present invention and is shown only for purposes of explanation.

Reference numeral 2 identifies the female or socket part of the prosthesis which is provided with a member 6 having a concave socket recess into which the portion 3 of the part 1 is to be inserted. The portion 6 is surrounded by a flange portion 9 which overlies the bead 10 of bone material surrounding the depression 7 of the ilium 8, in which depression the portion 6 is received, as shown. Unevenness of the portion 10 can be removed, for instance by grinding, to provide a planar contact surface for the flange portion 9.

To anchor the component 2 to the ilium 8, the flange portion 9 is provided with a plurality of apertures 11 distributed over its circumference. The apertures 11 each receive a retaining element, in the illustrated embodiment an expander screw 12. Depending upon the distribution of the apertures 11, which depends upon the configuration of the bead 10 and its ability to receive at different circumferential portions an expansion anchor sleeve, the bead 10 is formed with bores 13 by the surgeon, or by a member of the surgical team, and into these bores 13 the expansion anchor sleeves 12 are inserted in non-expanded condition. It is advantageous to use templates for forming the bores 13, to assure that they will later be in proper alignment with the apertures 11.

Once the bores 13 have been provided, the expansion anchor sleeves 12 are pushed through the apertures 11 of the flange portion 9 and into the bores 13. Expander screws 14 are now threaded into the sleeves 12, to expand the same to the extent shown in FIG. 1, or even to a greater extent, and as a result of this the flange portion 9 is firmly clamped between and immovably held by the head 15 of the respective expander screw 14 and the corticalis of the bead 10. It is to be understood that the expansion anchor sleeves 12 are preferably manufactured of rustfree metal, for instance stainless steel known under the designation V 2 A, X 12 CR NI 18 8 steel being a typical example of a V 2 A steel, or stainless steel known under the designation V 4 A, X 5 CR NI MO 18 10 being a typical example of a V 4 A steel, or titanium-alloyed stainless steel.

If desired, a washer 16 may be placed beneath the head 15 of the respective screw 14, and in order to prevent undesired turning of the respective screw 14 and loosening of the component 2, these washers 16 may be provided with one or more portions 17 which are bent about the respectively associated head 15 after the screws 14 have been tightened to the requisite extent.

FIG. 2 shows how the apertures 11 with the expansion anchors 12 may be circumferentially distributed on the flange portion 9. Depending upon the particular patient and the bone structure encountered, the width of the flange portion 9 may vary between substantially 10 mm. and 25 mm.

Figure 3:
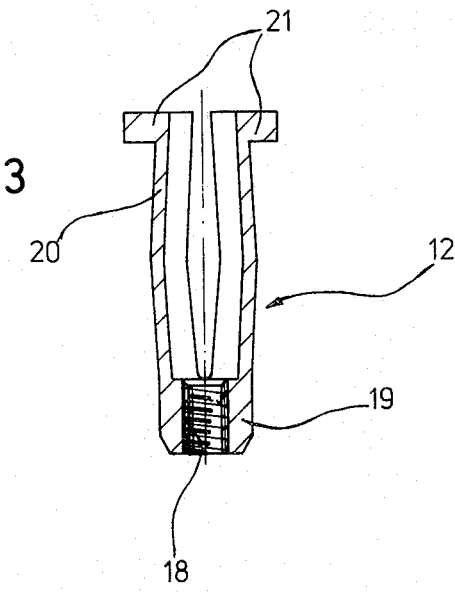
FIG. 3 is an axial section through an expansion anchor sleeve used in installing the embodiment of FIG. 1.

FIG. 3 shows one possible embodiment of the expander sleeve of the expansion anchor 12. Here, the sleeve has a tubular portion 19 provided with an internal screw thread and which is the leading portion, that is the one which is first inserted into the respective bore 13. Strips 20 extend rearwardly from the portion 19 in longitudinal direction and are of transversely arcuate configuration. The free ends of the strips 20 are provided with a flange 21 which may be of generally polygonal outline, for instance quadratic or rectangular. The apertures 11 are of similar contour, so that they can matingly receive the respective flange 21 to prevent undesired turning of the expansion anchor sleeve as the screw 14 is threaded into it, that is into the internal screw thread 18 of the tubular portion 19, so as to exert axial compressive stress and thereby effect radial buckling of the portions 20.

If the flange 21 is of rectangular configuration, or of similar configuration permitting the selection of the desired orientation, it can be assured that the direction in which the buckling of the portions 20 will take place within the bone structure in which the bores 13 are formed is predetermined by appropriately inserting the expansion sleeves. It is advantageous if this direction of buckling will take place tangentially of the bone bead 10 because if it were to take place radially of the same, the bead 10 might be fractured because in this direction its thickness is small.

When the threads of the screw 13 mesh with the threads 18 of the tubular portion 19, the latter is drawn in direction towards the head 15 of the screw 14, the head being, of course, held by contact with the flange portion 9, so that the two strip portions 20 buckle radially outwardly and fold axially behind the corticalis of the ilium 8. In order to assure the buckling at the desired locations, the portions 20 may be provided with weakened zones, for instance cutouts, kerfs or the like, which reduce the force required for effecting the buckling and which predetermine the location at which the buckling will take place. They may, however, be slightly prebent at the desired locations, as shown in FIG. 3, which will have the same effect.

It will be understood that each of the elements described above, or two or more together, may also find a useful application in other types of constructions differing from the type described above.

While the invention has been illustrated and described as embodied in a hip joint prosthesis, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A hip joint prosthesis for jointing the femur to the ilium which has an osseous corticalis surrounding a hollow space filled with sponge-like medulla and formed with a concave depression circumferentially surrounded by an osseous bead, comprising a socket member having a convex portion adapted to be received in the concave depression of the corticalis of the ilium, and a flange portion surrounding said convex portion and adapted to overlie and contact the corticalis of the bead when said convex portion is received in the concave depression of the ilium, said flange portion being formed with circumferentially distributed apertures to be aligned with bores which are provided in the corticalis of the bead and extend into the hollow space of the illium; and a plurality of expansion anchors for connecting said socket member to the ilium and including expansion anchor sleeves inserted into the respective apertures of said flange portion so as to extend into the bores in the corticalis of the bead and into the hollow space of the ilium, each of said expansion anchor sleeves including a leading portion of tubular configuration and provided with an internal screw thread, and a trailing portion extending from said leading portion and composed of a plurality of axially extending strips which are arcuately bent in transverse direction; and expander screws in said expansion anchor sleeves inserted through said trailing portion into meshing engagement with said screw thread and exerting an axial compressive force on said sleeve to effect radially outward buckling of said strips in the hollow space behind the corticalis until said expansion anchor sleeves are securely anchored behind the corticalis and said socket member is thus removably connected to the corticalis of the ilium.

2. A hip joint prosthesis as defined in claim 1, wherein said apertures are of polygonal outline, and wherein said expansion anchors each have an end portion of corresponding polygonal outline which is matingly received in one of said apertures.

3. A hip joint prosthesis as defined in claim 1, said expander screws each having a head adjacent said flange portion; and further comprising a plurality of washers each surrounding one of said screws intermediate the head thereof and said flange portion, said washers each having at least one retaining portion which is bent about said head so as to prevent the associated screw from undesired turning.

4. A hip joint prosthesis as defined in claim 1, wherein said member is of polyethylene.

* * * * *